April 3, 1956     G. R. NELSON     2,740,371
SIGNALING DEVICE FOR LAWN SPRINKLERS
Original Filed April 17, 1953
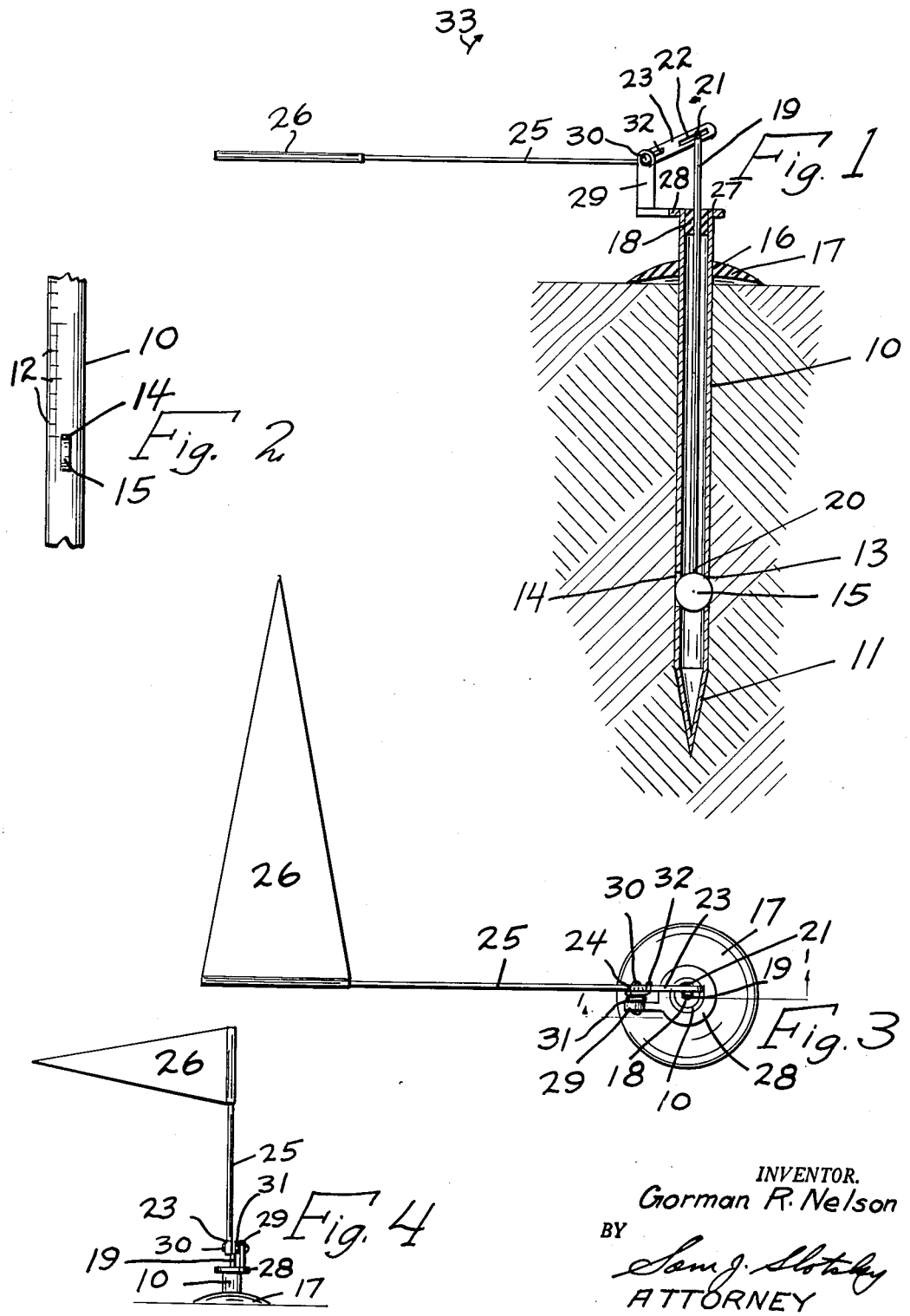
INVENTOR.
Gorman R. Nelson
BY
*Sam J. Slotsky*
ATTORNEY

United States Patent Office 2,740,371
Patented Apr. 3, 1956

2,740,371
SIGNALING DEVICE FOR LAWN SPRINKLERS
Gorman R. Nelson, Sioux Falls, S. Dak.

Original application April 17, 1953, Serial No. 349,392. Divided and this application July 26, 1954, Serial No. 445,871

2 Claims. (Cl. 116—118)

My invention relates to a signaling device for lawn sprinklers.

An object of my invention is to provide a device which will indicate when a pre-determined moisture penetration has been effected during sprinkling of a lawn etc.

A further object of my invention is to provide a simple device which operates in a simple manner, and is easily set for the required purpose.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a sectional view of the device taken substantially along the lines 1—1 of Figure 3, Figure 2 is a detail, Figure 3 is a plan view of Figure 1, and Figure 4 is an end view of Figure 1, and when the indicating flag is raised.

My invention relates to a device for lawn sprinkler systems or the like, it being understood also that the device could be applicable to other water systems as well.

The present application is a division of application Serial No. 349,392, filed April 17, 1953.

I have used the character 10 to indicate a hollow tube having the pointed extremity 11, the tube 10 having a series of marks in inches and fractions of an inch as indicated by the character 12 in Figure 2, the tube 10 also including a pair of openings 13 and 14, and through the opening 14 is placed the tablet 15 which tablet 15 is made of any suitable material which will rapidly disintegrate or dissolve in the presence of water.

Closely engaging the tube 10 at 16 is a guard member 17, and received within the tube 10 at the upper end thereof is the gasketing member 18 through which passes the rod 19, the lower end 20 of the rod 19 being adapted to bear against the tablet 15.

The end of the rod 19 includes a short pin 21 which is received within the slot 22 of a member 23 which member 23 is attached at 24 to a further rod 25, to which rod 25 is secured the flag member 26.

Attached to the tube 10 at 27 is the bracket member 28 which includes the post 29, and passing through the post 29 and through the member 23 is a pin 30 which pin is received within the coiled helical spring 31, which spring 31 is secured at 32 to the member 23, the spring 31 being adapted to normally urge the rod 25 and flag 26 upwardly in the direction of the arrow 33.

In using the device, the tablet 15 is placed in position as shown, and the tube 10 is forced downwardly into the soil until the length in inches at which the moisture penetration is to be indicated is shown at the ground level at which the member 17 is placed in the position shown.

As soon as the sprinkler system causes the moisture to penetrate the required depth, the tablet 15 will disintegrate and the rod 19 will then be released by the spring action of the spring 31 whereupon the flag 26 will move upwardly to the vertical position, and as shown in Figure 4, indicating when the proper depth of moisture has been reached so that the water can then be shut off in the sprinkler system.

It should be realized that the device of my invention could be used in other locations and environments as well, and it will now be seen that I have provided the advantages mentioned in the objects of my invention with various other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A device of the character described comprising a vertically positioned tube, a rod within said tube, a dissolvable tablet secured in said tube against which said rod bears, spring means for forcing said rod downwardly, said tube including a bracket attached thereto, a further rod pivoted to said bracket, a flag member attached to said further rod, said further rod including an extending portion pivoted to said rod whereby dissolving of said tablet will cause said spring means to urge said rod downwardly and to raise said flag.

2. A device of the character described comprising a vertically positioned tube, a rod within said tube, a dissolvable tablet secured in said tube against which said rod bears, spring means for forcing said rod downwardly, said tube including a bracket attached thereto, a further rod pivoted to said bracket, a flag member attached to said further rod, said further rod including an extending portion pivoted to said rod whereby dissolving of said tablet will cause said spring means to urge said rod downwardly and to raise said flag, said tube having markings thereon to indicate the depth between a ground surface and said tablet.

References Cited in the file of this patent
UNITED STATES PATENTS

| | | |
|---|---|---|
| 2,105,683 | Burdick | Jan. 18, 1938 |
| 2,459,267 | Dwyer | Jan. 18, 1949 |
| 2,693,781 | Opp | Nov. 9, 1954 |